United States Patent
Kim

(10) Patent No.: US 9,802,530 B2
(45) Date of Patent: Oct. 31, 2017

(54) HEIGHT-ADJUSTABLE WARNING LAMP WITH EMERGENCY LIGHT INDICATING MEANS

(71) Applicant: SUNG-HWA Technology Industry Co., Ltd., Seoul (KR)

(72) Inventor: Byoung-ouk Kim, Incheon (KR)

(73) Assignee: SUNG-HWA Technology Industry Co., Ltd., Seoul (KR)

( * ) Notice: Subject to any disclaimer, the term of this patent is extended or adjusted under 35 U.S.C. 154(b) by 192 days.

(21) Appl. No.: 14/825,571

(22) Filed: Aug. 13, 2015

(65) Prior Publication Data

US 2016/0167572 A1    Jun. 16, 2016

(30) Foreign Application Priority Data

Dec. 12, 2014    (KR) .......................... 10-2014-0179042

(51) Int. Cl.
*B60Q 1/26*    (2006.01)

(52) U.S. Cl.
CPC .......... *B60Q 1/2611* (2013.01); *B60Q 1/2657* (2013.01); *B60Q 1/2692* (2013.01)

(58) Field of Classification Search
CPC .... B60Q 1/2611; B60Q 1/52; B60Q 2400/50; B60Q 1/2657; B60Q 1/2692
See application file for complete search history.

(56) References Cited

U.S. PATENT DOCUMENTS

2012/0113666 A1*    5/2012   Slipp .................... B60Q 1/2611
                                                                362/523

FOREIGN PATENT DOCUMENTS

| KR | 10-2011-0097328 A | 8/2011 |
| KR | 10-2012-0073556 A | 7/2012 |
| KR | 10-2012-0135659 A | 12/2012 |
| KR | 10-1384622 B1 | 4/2014 |
| KR | 10-2014-0066301 A | 6/2014 |

* cited by examiner

*Primary Examiner* — Curtis Odom
(74) *Attorney, Agent, or Firm* — KORUS Patent, LLC; Seong Il Jeong

(57) ABSTRACT

Disclosed herein is a height-adjustable warning lamp with an emergency light indicating means. The warning lamp includes a main body and a sub body such that the main body and the sub body are separated from each other in a vertical direction in order to extend the height of the warning lamp based on the situations on a road. The warning lamp is configured as a single-body structure when the main body and the sub body are coupled to each other, wherein, when the sub body is moved upward from the main body, a light emitting diode (LED) lamp, which is received in the main body and is formed in the shape of an arrow for indicating an advancing direction, is unfolded, thereby improving external visibility of the warning lamp and thus effectively preventing collisions with other vehicles while guiding the safe driving of other vehicles.

8 Claims, 9 Drawing Sheets

HEIGHT-ADJUSTABLE WARNING LAMP WITH EMERGENCY LIGHT INDICATING MEANS

BACKGROUND OF THE INVENTION

Field of the Invention

The present invention relates to a warning lamp mounted on the roof of a vehicle, such as a patrol car, an ambulance, or a road repairing car, and more particularly to a height-adjustable warning lamp with an emergency light indicating means, the warning lamp including a main body and a sub body such that the main body and the sub body are separated from each other in a vertical direction in order to extend the height of the warning lamp based on the situations on a road, and the warning lamp is configured as a single-body structure when the main body and the sub body are coupled to each other, wherein, when the sub body, which is a separate warning lamp, is moved upward from the main body, which is installed on a vehicle in a fixed state, it is possible to improve external visibility of the warning lamp, thereby preventing collisions with other vehicles while guiding safe driving of other vehicles, wherein, when the sub body is moved upward, a light emitting diode (LED) lamp, which is received in the main body and is formed in the shape of an arrow for indicating an advancing direction, is unfolded and exposed, thereby safely guiding the movement of the following vehicles, and wherein a lighting bar is coupled to the front surface and the rear surface of the sub body of the warning lamp such that the lighting bar can be selectively unfolded in order to function as an emergency triangular stand or a shaking bar, thereby guiding safe driving of vehicles.

Description of the Related Art

In general, a warning lamp, which is used to indicate that an emergency situation has occurred, is mounted on the roof of an emergency vehicle, such as a patrol car, an ambulance, a fire engine, a tractor, a road maintenance car, a special equipment car for expressways, or a disaster recovery car. A conventional warning lamp is installed on the roof of the vehicle using a bracket. Examples of a conventional warning lamp are disclosed in Korean Patent Application Publication No. 10-2011-0097328 (published on Aug. 31, 2011) and Korean Patent Application Publication No. 10-2012-0073556 (published on Jul. 5, 2012).

However, the disclosed warning lamp is installed on the roof of a vehicle in a fixed state. As a result, when there are other vehicles having heights higher than that of the warning lamp or when the trunk of the vehicle on which the warning lamp is mounted is open, drivers of other vehicles may not see light emitted from the warning lamp and thus the emergency situation may not be effectively indicated. Furthermore, a vehicle driven by a driver who does not recognize such an emergency situation may collide with the vehicle on which the warning lamp is mounted.

In order to solve the above-mentioned problems with the conventional warning lamp, there has been developed a warning lamp including a main body, a cover, and a lift, wherein the cover is moved upward to extend the height of the warning lamp as needed, which is disclosed in Korean Patent Application Publication No. 10-2012-0135659 (published on Dec. 17, 2012). In addition, there has been developed a lift-type warning lighting device configured to have a structure in which a lift storage box, in which a lift installed to move a warning lamp upward is received, is installed on the roof of a vehicle in a fixed state, the warning lamp is mounted to an upper cover of the lift storage box such that, when the cover is moved upward, the warning lamp, which is mounted to the cover, is located at a predetermined height, which is disclosed in Korean Registered Patent No. 10-1384622 (published on Apr. 16, 2014).

In the height-adjustable warning lamps as described above, however, the cover is moved upward and downward to adjust the height of the warning lamp. Consequently, although external visibility of the warning lamp is improved, it is not possible to provide a function to guide safe driving of vehicles while indicating that there is a construction site or a no-go zone. Furthermore, in the latter case, i.e. in the case in which the warning lamp is mounted at the upper cover of the lift storage box, which is fixedly installed on the roof of the vehicle, the lift storage box, in which the lift is received, meets large air resistance. As a result, the fuel economy of the vehicle is considerably reduced, whereby the mobility of the vehicle is lowered.

For these reasons, in a case in which it is necessary to add a function to safely guide vehicles, an indication plate constituted by a light emitting diode (LED) lamp formed in the shape of an arrow must be additionally installed on the vehicle on which the warning lamp is mounted. In this case, however, the perimeter of the vehicle on which the warning lamp is mounted is complicated due to the installation of the indication plate, and cost is incurred for installation of the indication plate.

SUMMARY OF THE INVENTION

Therefore, the present invention has been made in view of the above problems, and it is an object of the present invention to provide a height-adjustable warning lamp with an emergency light indicating means, the warning lamp including a main body and a sub body such that the main body and the sub body are separated from each other in a vertical direction in order to extend the height of the warning lamp based on the situations on a road, and the warning lamp is configured as a single-body structure when the main body and the sub body are coupled to each other, wherein, when the sub body, which is a separate warning lamp, is moved upward from the main body, which is installed on a vehicle in a fixed state, a light emitting diode (LED) lamp, which is received in the main body and is formed in the shape of an arrow for indicating an advancing direction, is unfolded, thereby improving external visibility of the warning lamp and thus effectively preventing collisions with other vehicles while guiding the safe driving of other vehicles.

It is another object of the present invention to provide a height-adjustable warning lamp including speakers provided at the left and right sides of the main body of the warning lamp such that the speakers are spaced apart from each other, wherein the speakers simultaneously output a sound in a state in which the sound is divided into treble and bass in order to feel as if there were several vehicles, thereby maximizing ambience and tension.

It is a further object of the present invention to provide a height-adjustable warning lamp with an emergency light indicating means including a lighting bar coupled to the front surface and the rear surface of the sub body of the warning lamp such that the lighting bar can be selectively unfolded in order to function as an emergency triangular stand or a shaking bar, thereby guiding safe driving of vehicles.

In accordance with an aspect of the present invention, the above and other objects can be accomplished by the provision of a height-adjustable warning lamp with an emergency light indicating means including a main body installed at an outer roof of a vehicle in a fixed state, the main body having lighting parts formed at a front surface and a rear surface thereof and at a left side surface and a right side surface thereof, a sub body received in the main body such that the sub body can be moved upward, the sub body having lighting parts formed at a front surface and a rear surface thereof such that the sub body can function as a separate warning lamp, the sub body being movable upward such that the sub body can extend to a predetermined height, and a lift unit for interconnecting the main body and the sub body through a lift driving link and a lift driven link, which are coupled to each other in an X shape, the lift unit being driven to extend the height of the sub body, wherein the main body and the sub body are coupled to each other such that the main body and the sub body are separated from each other in a vertical direction in order to extend the height of the sub body based on the situations on a road, and an indication plate is coupled to the lift driving link and the lift driven link of the lift unit such that the indication plate is unfolded when the sub body is moved upward according to a driving operation of the lift unit, and the indication plate is folded and received in the main body when the sub body is moved downward according to the driving operation of the lift unit, the indication plate having a blinking light emitting diode (LED) lamp or an LED indication window for message announcement formed at an exposed surface thereof.

The indication plate may be an arrow for indicating an advancing direction.

The indication plate may include a main frame provided with a guide rail for guiding a hinge of the lift driving link, and direction-indicating frames coupled to opposite ends of the main frame via hinges such that the direction-indicating frames are elastically unfolded when the sub body is moved upward, and the direction-indicating frames are folded when the sub body is moved downward.

A lighting bar, to which an LED lamp is applied, may be coupled to the front surface or the rear surface of the sub body such that the lighting bar can be selectively unfolded in order to function as an emergency triangular stand or a shaking bar.

The lighting bar may be connected to a driving shaft of a driving motor installed in the sub body or a rotary shaft connected to the driving shaft, and the lighting bar, which is connected to the rotary shaft, may be unfolded by the driving motor according to an input control program.

A pair of speakers may be provided at left and right sides of the main body, and the speakers may be configured to simultaneously output a sound in a state in which the sound is divided into treble and bass in order to feel as if there were several vehicles.

The lift unit may include a connecting rod connected between a pair of the lift driving links, a linear bearing block coupled to one side of a lower end of each of the lift driving links, a stationary block formed at one end of a lower surface in the sub body such that an upper end of each of the lift driving links is rotatably coupled to the stationary block, a movable block formed at the other end of the lower surface in the sub body such that an upper end of each of the lift driven links is movably coupled to the movable block, linear rails formed at a bottom surface of the main body and at the lower surface of the sub body such that the other side of the lower end of each of the lift driving links and the other side of the upper end of each of the lift driven links are rotatably coupled to the linear rails, the linear bearing block, which is coupled to one side of the lower end of each of the lift driving links, and the movable block, which is coupled to the upper end of each of the lift driven links, being linearly movably coupled to the linear rails, and a driving unit, having a driving rod rotatably connected to the connecting rod via a hinge, for linearly moving the lift driving links and the lift driven links along the linear rails such that the lift driving links and the lift driven links can be moved upward and downward.

Alternatively, the lift unit may include a connecting rod connected between a pair of the lift driving links, a sliding pipe coupled to one side of a lower end of each of the lift driving links, a stationary block formed at one end of a lower surface in the sub body such that an upper end of each of the lift driving links is rotatably coupled to the stationary block, a movable block formed at the other end of the lower surface in the sub body such that an upper end of each of the lift driven links is movably coupled to the movable block, square-shaped pipe rails formed at a bottom surface of the main body and at the lower surface of the sub body such that the other side of the lower end of each of the lift driving links and the other side of the upper end of each of the lift driven links are rotatably coupled to the pipe rails, the sliding pipe, which is coupled to one side of the lower end of each of the lift driving links, and the movable block, which is coupled to the upper end of each of the lift driven links, being linearly movably coupled to the pipe rails, and a driving unit, having a driving rod rotatably connected to the connecting rod via a hinge, for linearly moving the lift driving links and the lift driven links along the pipe rails such that the lift driving links and the lift driven links can be moved upward and downward.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Reference will now be made in detail to the preferred embodiments of the present invention, examples of which are illustrated in the accompanying drawings.

Figure 1:
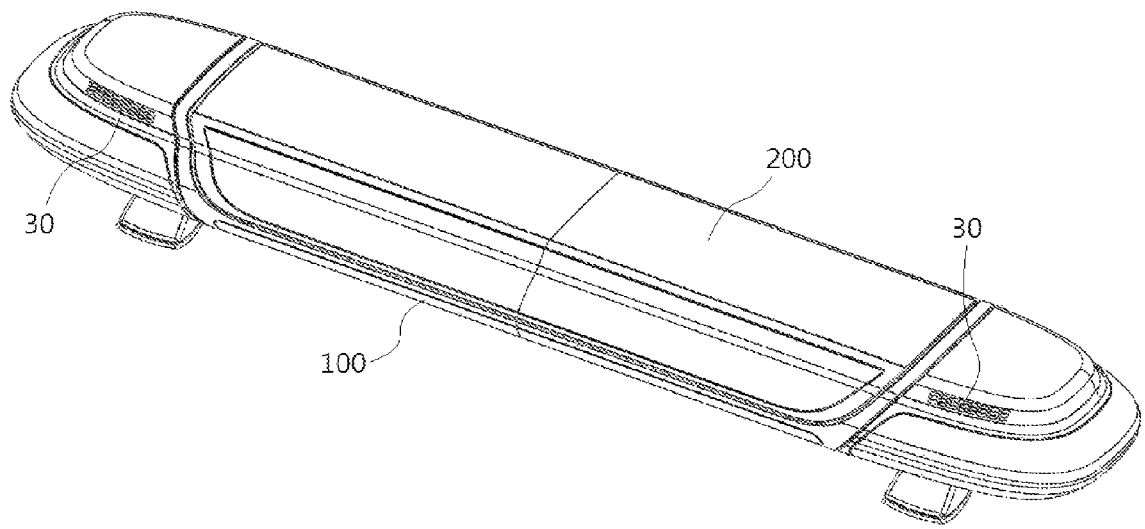
FIG. 1 is a perspective view showing the structure of a warning lamp according to an embodiment of the present invention.
Figure 2:
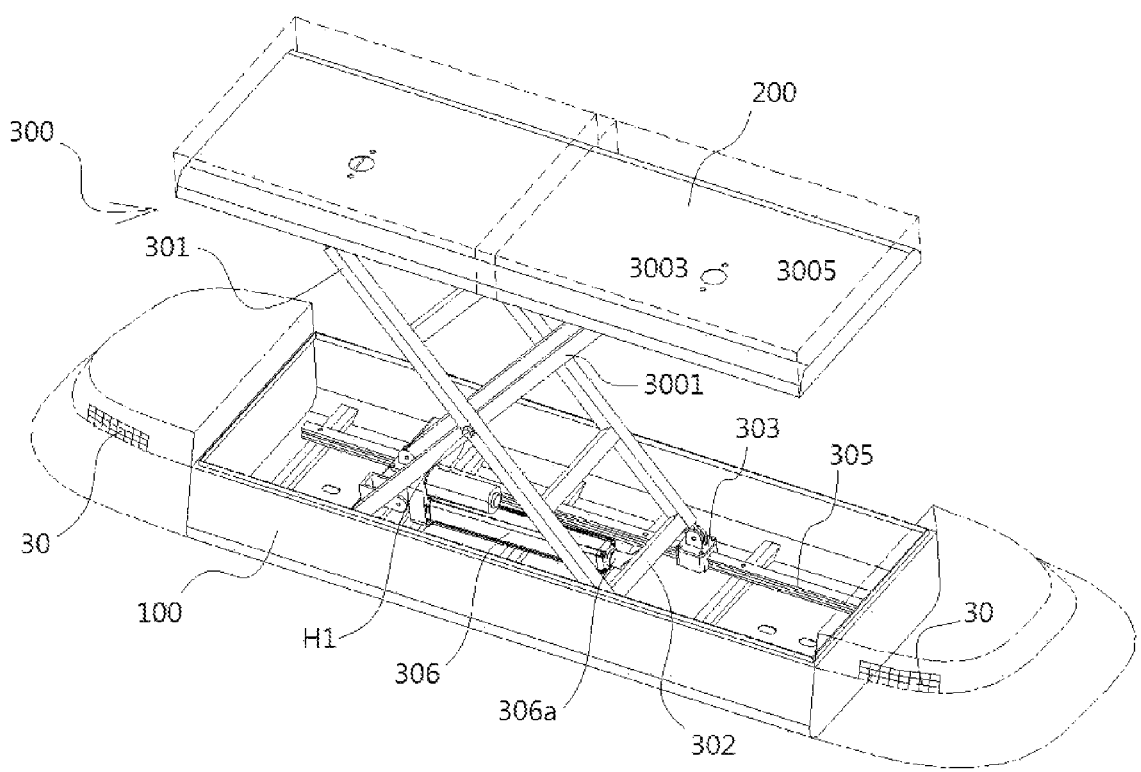
FIG. 2 is a perspective view showing an upwardly moved state of the warning lamp according to the embodiment of the present invention.
Figure 3:
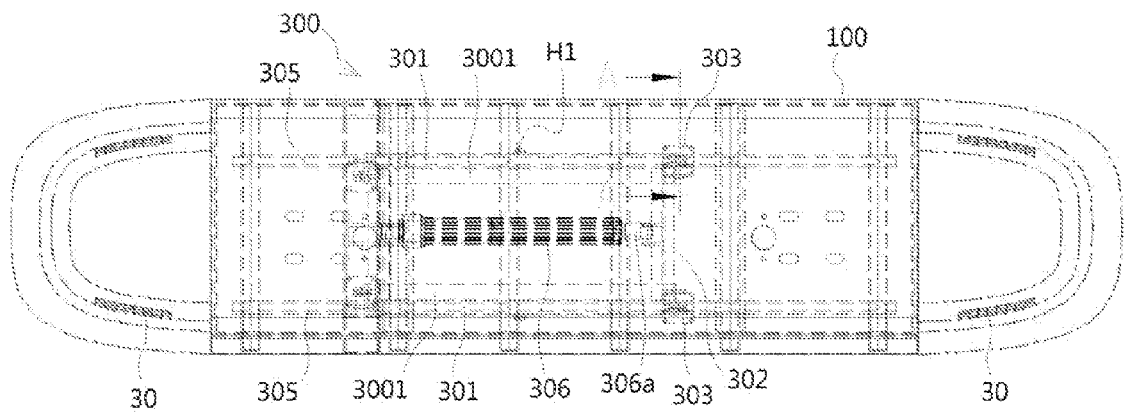
FIG. 3 is a plan view schematically showing the structure of the warning lamp according to the embodiment of the present invention.
Figure 4:
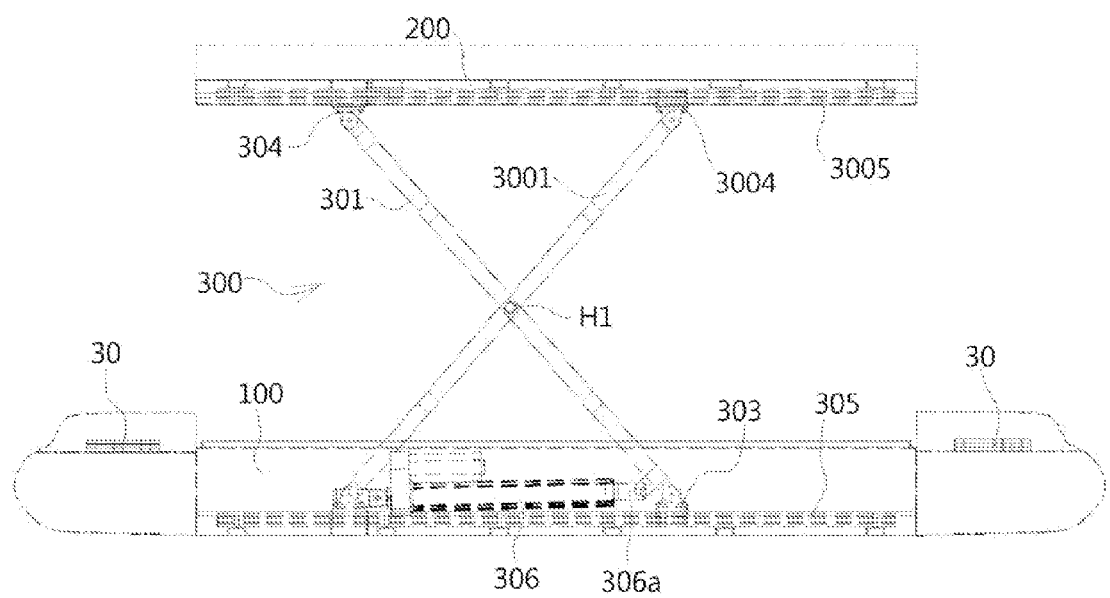
FIG. 4 is a sectional view taken along line A-A of FIG. 3.
Figure 5:
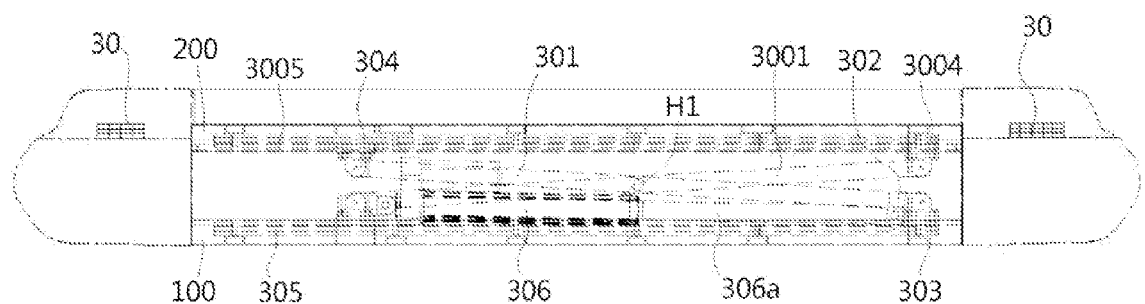
FIG. 5 is a side view schematically showing a developed state of a sub body of the warning lamp according to the embodiment of the present invention.
Figure 6:
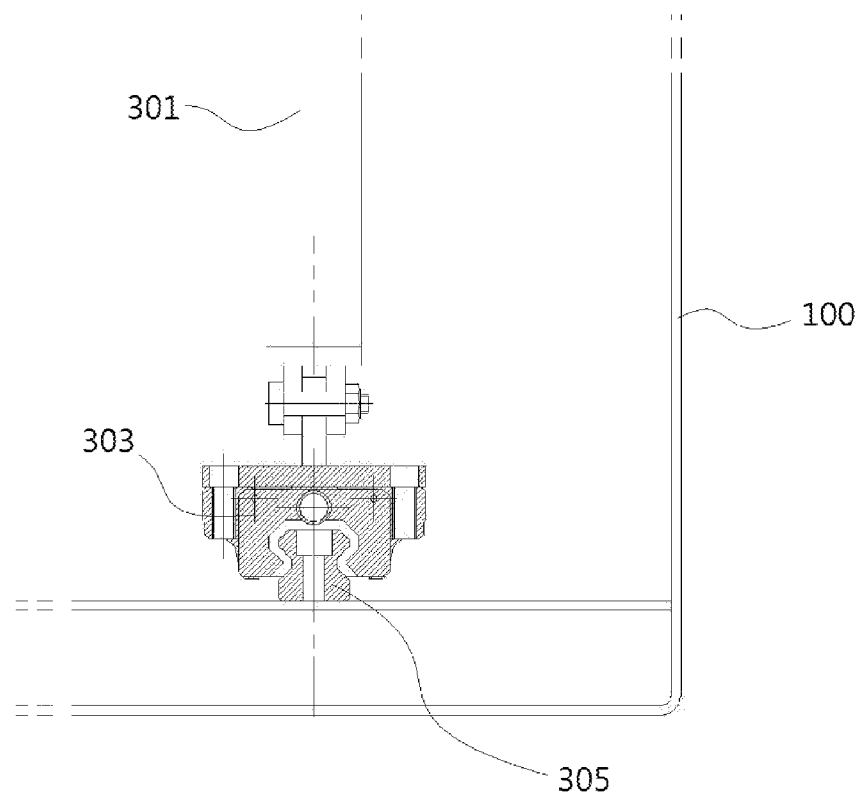
FIG. 6 is a side view schematically showing a received state of the sub body of the warning lamp according to the embodiment of the present invention.

FIG. 1 is a perspective view showing the structure of a warning lamp according to an embodiment of the present invention, and FIGS. 2 to 8 are views schematically showing a main body 100 and a sub body 200 of the warning lamp in order to describe the structural characteristics of the warning lamp according to the embodiment of the present invention in detail, wherein FIG. 2 is a perspective view showing an upwardly moved state of the warning lamp according to the embodiment of the present invention, FIG. 3 is a plan view schematically showing the structure of the warning lamp according to the embodiment of the present invention, FIG. 4 is a sectional view taken along line A-A of FIG. 3, FIG. 5 is a side view schematically showing a developed state of a sub body of the warning lamp according to the embodiment of the present invention, and FIG. 6 is a side view schematically showing a received state of the sub body of the warning lamp according to the embodiment of the present invention.

Referring to FIGS. 1 to 6, a height-adjustable warning lamp with an emergency light indicating means according to an embodiment of the present invention includes a main body 100 installed at an outer roof of a vehicle in a fixed state, the main body 100 having lighting parts formed at the front surface and the rear surface thereof and at the left side surface and the right side surface thereof, a sub body 200 received in the main body 100 such that the sub body 200 can be moved upward, the sub body 200 having lighting parts formed at the front surface and the rear surface thereof such that the sub body 200 can function as a separate warning lamp, the sub body 200 being movable upward such that the sub body 200 can extend to a predetermined height, and a lift unit 300 for interconnecting the main body 100 and the sub body 200 through a pair of lift driving links 301 and a pair of lift driven links 3001, which are coupled to each other in an X shape, the lift unit 300 being driven to extend the height of the sub body 200, wherein an indication plate 10, which has a blinking light emitting diode (LED) lamp or an LED indication window for message announcement formed at an exposed surface thereof, is coupled to the lift driving links 301 and the lift driven links 3001 of the lift unit 300, and a lighting bar 20, to which an LED lamp is applied, is coupled to the front surface and/or the rear surface of the sub body 200 such that the lighting bar 20 can be selectively unfolded in order to function as an emergency triangular stand or a shaking bar.

Speakers 30 are provided at the left and right sides of the main body 100. The speakers 30 are configured to simultaneously output a sound in a state in which the sound is divided into treble and bass in order to feel as if there were several vehicles.

The lift unit 300 includes a connecting rod 302 connected between the lift driving links 301, a linear bearing block 303 coupled to one side of the lower end of each of the lift driving links 301, a stationary block 304 formed at one end of the lower surface in the sub body 200 such that the upper end of each of the lift driving links 301 is rotatably coupled to the stationary block 304, a movable block 3004 formed at the other end of the lower surface in the sub body 200 such that the upper end of each of the lift driven links 3001 is movably coupled to the movable block 3004, linear rails 305 and 3005 formed at the bottom surface of the main body 100 and at the lower surface of the sub body 200, respectively, such that the other side of the lower end of each of the lift driving links 301 and the other side of the upper end of each of the lift driven links 3001 are rotatably coupled to the linear rails 305 and 3005, respectively, the linear bearing block 303, which is coupled to one side of the lower end of each of the lift driving links 301, and the movable block 3004, which is coupled to the upper end of each of the lift driven links 3001, being linearly movably coupled to the linear rails 305 and 3005, and a driving unit 306, having a driving rod 306a rotatably connected to the connecting rod 302 via a hinge, for linearly moving the lift driving links 301 and the lift driven links 3001 along the linear rails 305 and 3005 such that the lift driving links 301 and the lift driven links 3001 can be moved upward and downward.

The indication plate 10 is an arrow for indicating an advancing direction. When the sub body 200 is moved upward according to the driving operation of the lift unit 300, the indication plate 10 is unfolded. When the sub body 200 is moved downward according to the driving operation of the lift unit 300, the indication plate 10 is folded. The indication plate 10 includes a main frame 11 and direction-indicating frames 12.

The main frame 11 is provided at an exposed surface thereof with a blinking LED lamp or an LED indication window for message announcement. The main frame 11 is provided with a guide rail 11a for guiding a hinge H1 of the lift driving links 301, at which the lift driving links 301 are coupled to the lift driven links 3001 in an X shape.

That is, the guide rail 11a is configured to guide the movement of the hinge H1 such that the lift driving links 301 and the lift driven links 3001 are unfolded about the hinge H1 according to the driving operation of the lift unit 300.

The direction-indicating frames 12 are coupled to opposite ends of the main frame 11. Blinking LED lamps are formed at exposed surfaces of the direction-indicating frames 12. When the sub body 200 is moved upward, the direction-indicating frames 12 are elastically unfolded. When the sub body 200 is moved downward, the direction-indicating frames 12 are folded.

Although not shown in the drawings, the lighting bar 20 is connected to a driving shaft of a driving motor installed in the sub body 200 or a rotary shaft connected to the driving shaft at the front surface and/or the rear surface of the sub body 200. When the driving motor is operated according to a control program, the lighting bar 20 is unfolded by the rotation of the driving shaft or the rotary shaft, which is interlocked with the driving motor.

In the height-adjustable warning lamp with the emergency light indicating means according to the embodiment of the present invention, as shown in FIGS. 1 to 6, the driving unit 306 of the lift unit 300 is operated to push the connecting rod 302 via the driving rod 306a of the driving unit 306.

The connecting rod 302 is connected between the lift driving links 301. The upper ends of the lift driving links 301 are rotatably coupled to the stationary blocks 304, which are formed at the sub body 200, via hinges. In addition, the other side of the lower end of each of the lift driving links 301 is rotatably coupled to the linear rail 305. The linear bearing block 303 is coupled to one side of the lower end of each of the lift driving links 301. The linear bearing block 303 is coupled to the linear rail 305, which is formed at the bottom surface of the main body 100, such that the linear bearing block 303 can be linearly moved along the linear rail 305.

On the other hand, the upper ends of the lift driven links 3001, which intersect the lift driving links 301 in an X shape in a state in which the lift driven links 3001 and the lift driving links 301 are symmetric with respect to the hinge H1 such that the lift driven links 3001 can be supported at the main body 100 and the sub body 200, are coupled to the movable blocks 3004, which can be slid along the linear rail 3005 formed at the inner surface of the sub body 200. The other side of the lower end of each of the lift driven links 3001 is fixed to the bottom surface of the main body 100 via a hinge such that the lift driven links 3001 can be rotated.

When the connecting rod 302 is linearly moved toward the driving unit 306 by the driving rod 306a, therefore, the linear bearing block 303 is linearly moved toward the driving unit 306 along the linear rail 305. As a result, the lift driving links 301 and the lift driven links 3001 are unfolded, whereby the sub body 200 coupled to the lift driving links 301 is maintained at a predetermined height.

When the lift driving links 30 are moved upward, the movement of the hinge H1 is guided in a horizontal direction along the guide rail 11a, which is formed at the main frame 11 of the indication plate 10.

That is, when the sub body 200 is moved upward, the hinge H1 of the lift driving links 301 is moved horizontally along the guide rail 11a, which is formed at the main frame 11 of the indication plate 10. At the same time, the main frame 11 is exposed to the outside, and the direction-indicating frames 12, which are coupled to opposite ends of the main frame 11, are elastically unfolded.

As a result, the LED lamps formed at the exposed surfaces of the main frame 11 and the direction-indicating frames 12 blink, or a message is output from the LED indication window formed at the exposed surface of the main frame 11, in order to improve external visibility of the vehicle and, in addition, to guide safe driving of following vehicles.

The speakers 30, which are provided at the left and right sides of the main body 100, simultaneously output a specific sound (e.g. a siren, which indicates the occurrence of an accident) in a state in which the sound is divided into treble and bass in order to feel as if there were several vehicles. As a result, vehicles passing by a spot where the accident took place may more seriously feel the accident, thereby attracting drivers' attention and thus more securely guiding safe driving.

Meanwhile, when it is necessary to push the sub body 200, which has been moved upward to a predetermined height, downward such that the sub body 200 covers the upper end of the main body 100, first, the driving rod 306a is pushed via the driving unit 306, which is included in the lift unit 300. The connecting rod 302 is linearly moved by the driving rod 306a in a direction in which the connecting rod 302 becomes more distant from the driving unit 306, and the movable block 3004 is moved along the linear rail 3005, which is formed at the inner surface of the sub body 200. As a result, the upper ends of the lift driven links 3001, which are installed correspondingly about the hinge H1, become distant from the stationary block 304.

Consequently, the linear bearing block 303 is linearly moved along the linear rail 305 in a direction in which the linear bearing block 303 becomes more distant from the driving unit 306 with the result that the lift driving links 301 and the lift driven links 3001 are folded. When the lift driving links 301 and the lift driven links 3001 are folded, the main frame 11 of the indication plate 10 is also moved downward, and is then received in the main body 100.

At this time, the direction-indicating frames 12, which are coupled to opposite ends of the main frame 11, are pushed while contacting the bottom surface of the sub body 200, which covers the main body 100. As a result, the direction-indicating frames 12 are received in the main body 100 in a state in which the direction-indicating frames 12 are arranged in line together with the main frame 11.

In addition, the lighting bar 20, which has the LED lamp formed at the exposed surface thereof, is rotatably coupled to the front surface and/or the rear surface of the sub body 200. Although not shown in the drawings, the lighting bar 20 is connected to the driving shaft of the driving motor installed in the sub body 200 or the rotary shaft connected to the driving shaft. When the driving motor is operated according to the control program, the lighting bar 20 is unfolded by the rotation of the driving shaft or the rotary shaft. As a result, the lighting bar 20 is erected vertically from the sub body 200. The vertically erected lighting bar 20 selectively functions as an emergency triangular stand or a shaking bar for guiding the safe driving of following vehicles.

Figure 7:
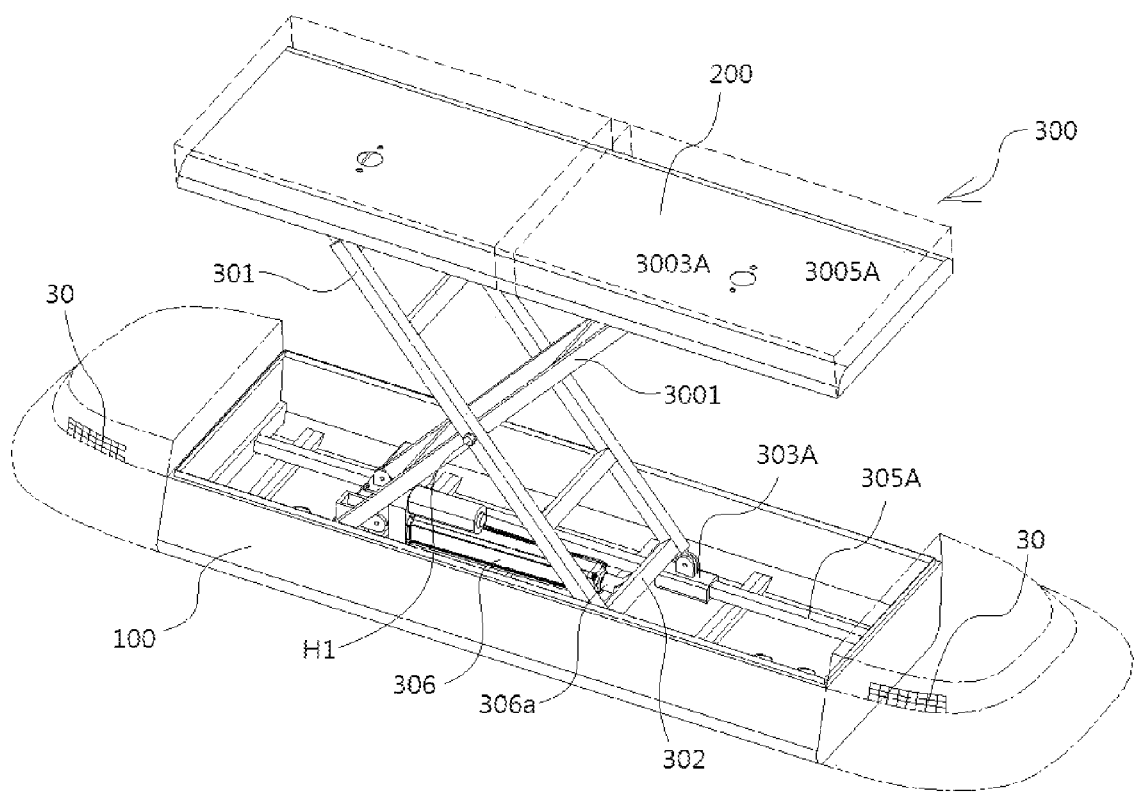
FIG. 7 is a perspective view showing an upwardly moved state of a warning lamp according to another embodiment of the present invention to which a pipe rail is applied.
Figure 8:
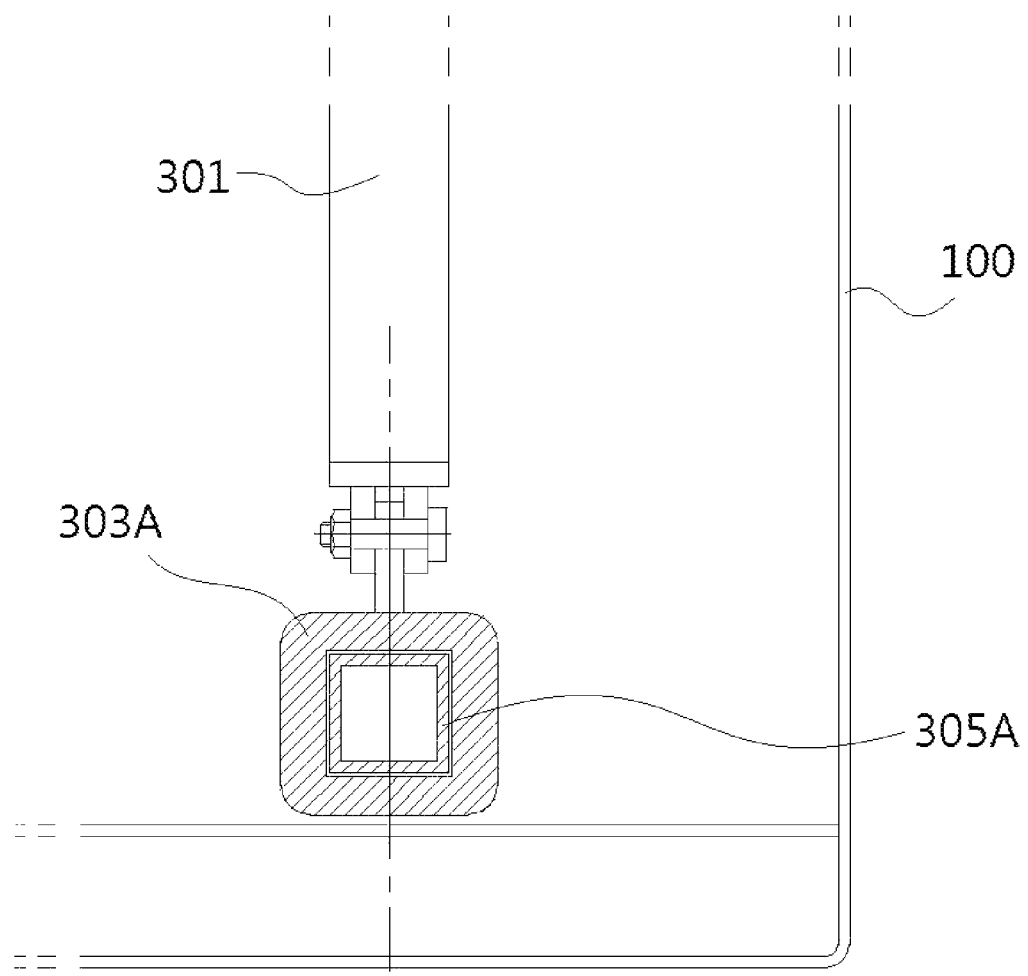
FIG. 8 is a perspective view showing a state in which the pipe rail is coupled to a sliding pipe in the warning lamp according to the embodiment of the present invention.

Meanwhile, FIGS. 7 and 8 are views showing a warning lamp according to another embodiment of the present invention. In this embodiment, a square-shaped pipe rail 305A is installed at the bottom surface of the main body 100, and a sliding pipe 303A is coupled to one side of the lower end of each of the lift driving links 301. The sliding pipe 303A is also coupled to the pipe rail 305A. When the lift driving links 301 are moved upward and downward, the sliding pipe 303A is linearly moved along the pipe rail 305A. The components of this embodiment that are identical to those of the previous embodiment, described with reference to FIGS. 1 to 6, are denoted by the same reference numerals, and a detailed description thereof will be omitted.

Figure 9:
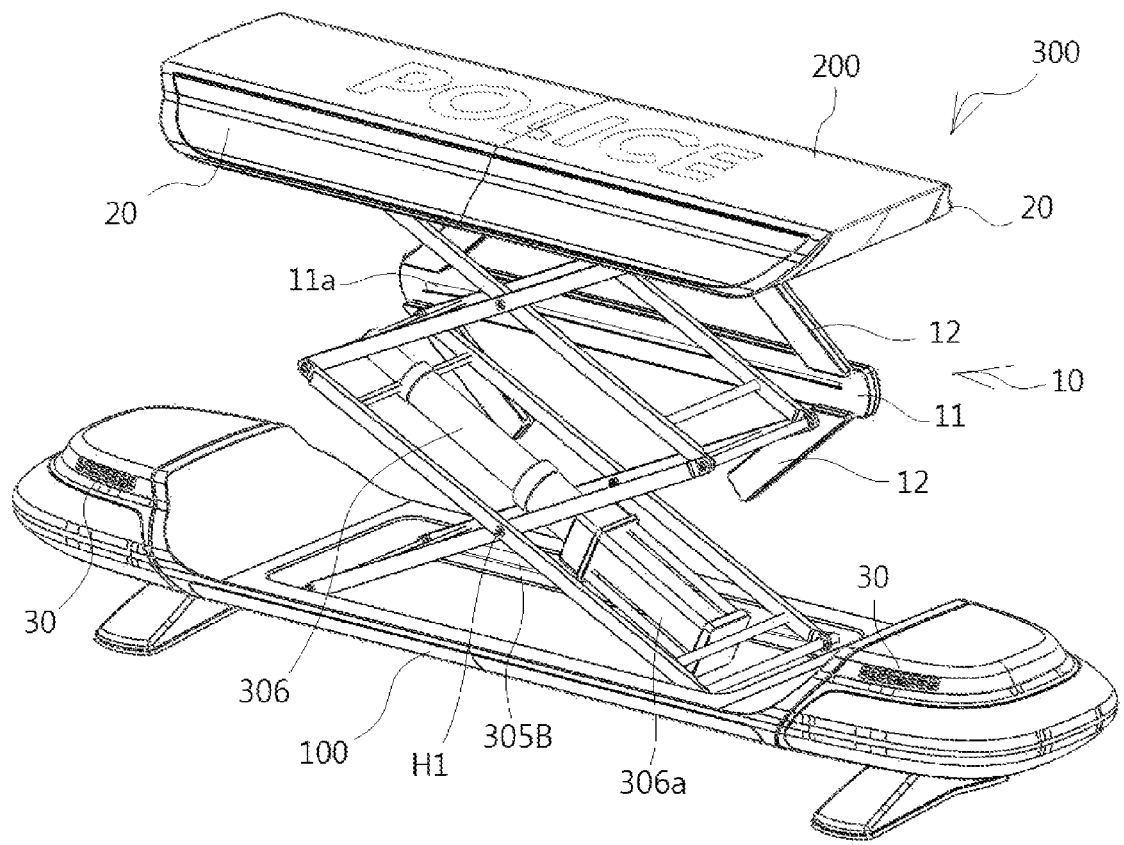
FIGS. 9 to 11 are perspective views showing a state in which a lift unit for interconnecting a main body and a sub body of a warning lamp according to a further embodiment of the present invention is configured to have a two-stage assembly structure including lift driving links and lift driven links.
Figure 10:
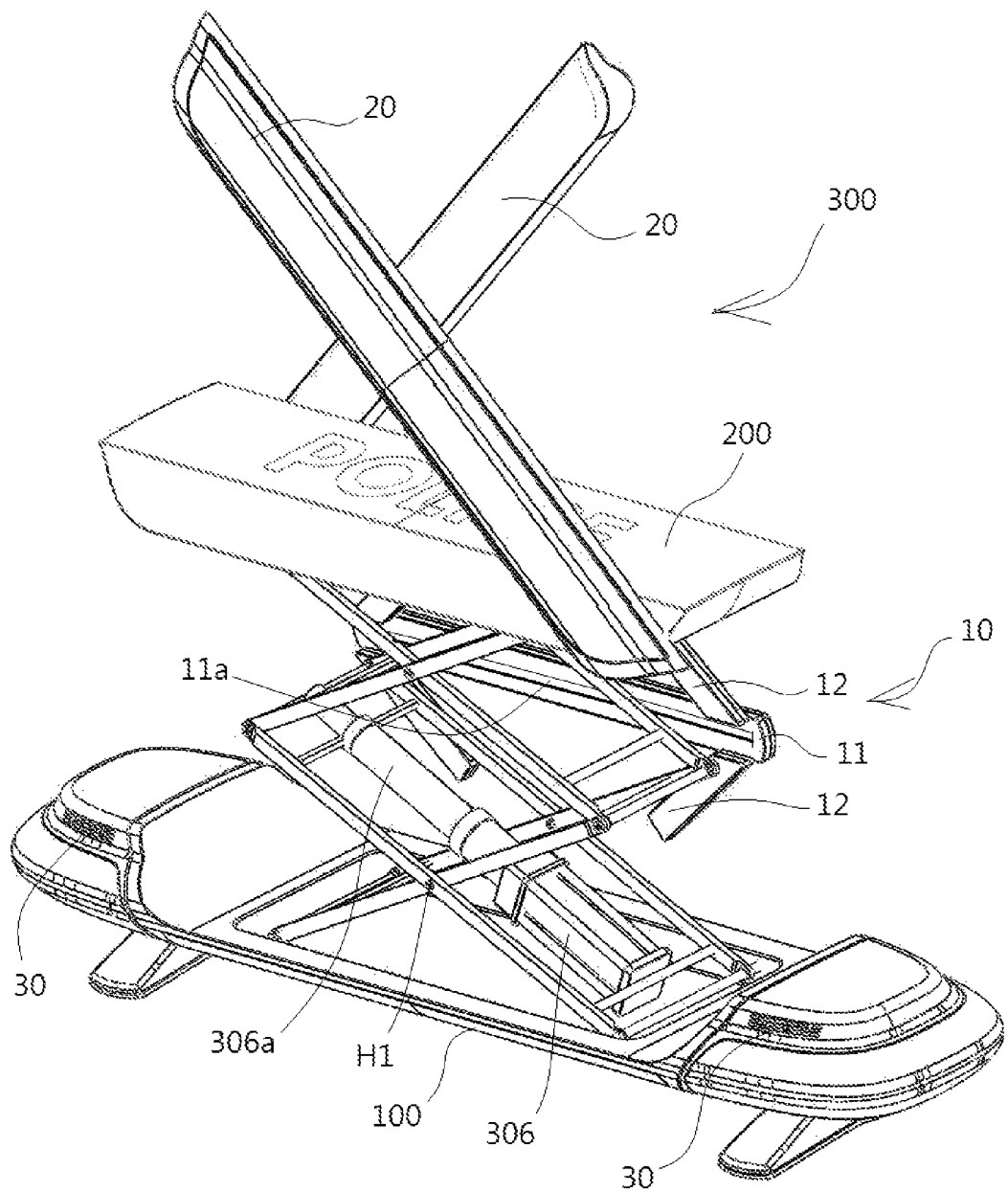
Figure 11:
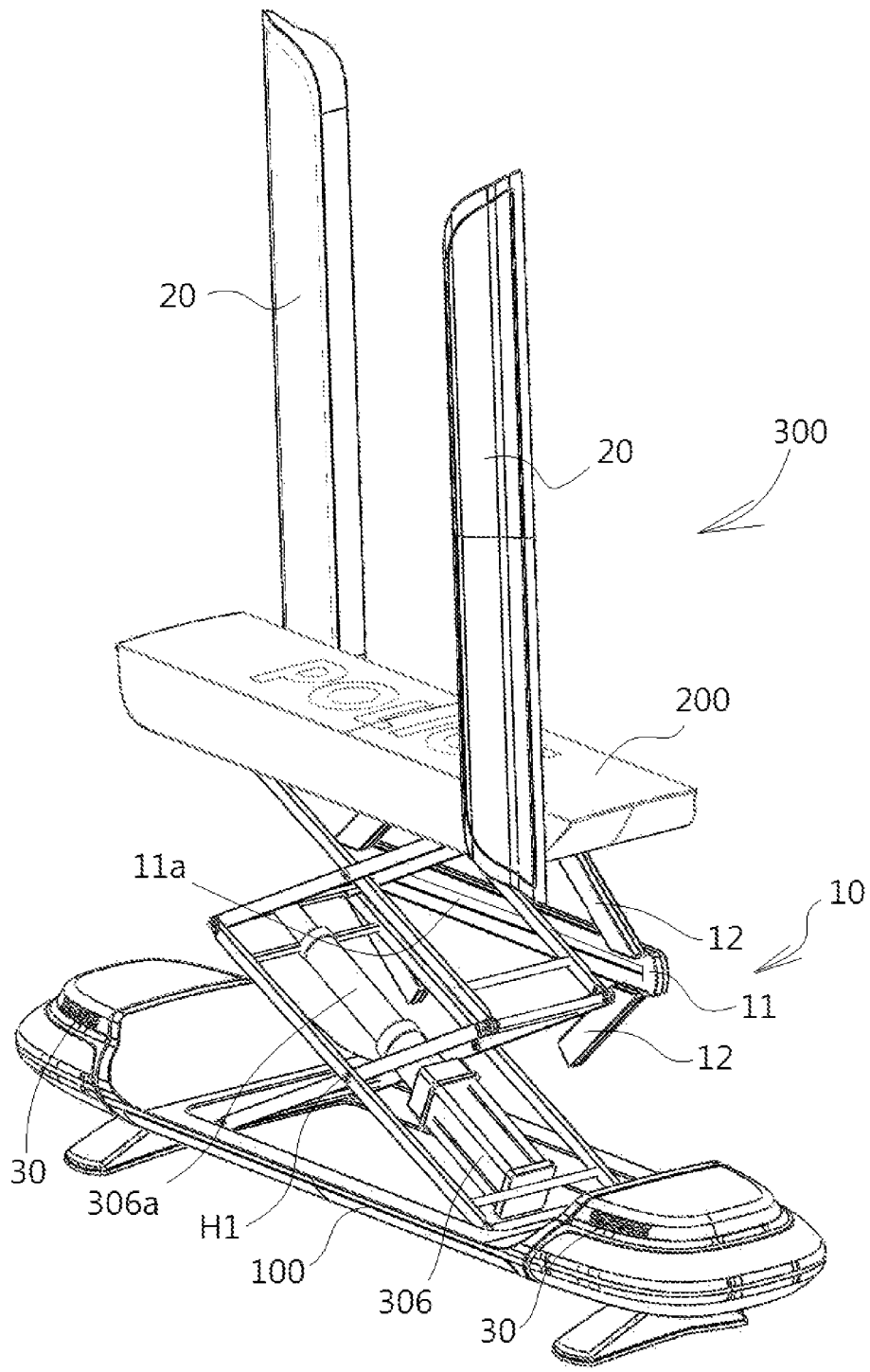

In addition, FIGS. 9 to 11 are views showing a warning lamp according to a further embodiment of the present invention. In this embodiment, the lift unit 300, which interconnects the main body 100 and the sub body 200, is configured to have a two-stage assembly structure including lift driving links 301 and lift driven links 3001. The lift unit 300 is operated as described in the previous embodiment, and a detailed description thereof will be omitted.

As is apparent from the above description, the present invention provides a warning lamp including a main body and a sub body such that the main body and the sub body are separated from each other in a vertical direction in order to extend the height of the warning lamp based on the situations on a road, and the warning lamp is configured as a single-body structure when the main body and the sub body are coupled to each other, wherein, when the sub body, which is a separate warning lamp, is moved upward from the main body, which is installed on a vehicle in a fixed state, an LED lamp, which is received in the main body and is formed in the shape of an arrow for indicating an advancing direction, is unfolded, thereby improving external visibility of the warning lamp and thus effectively preventing collisions with other vehicles while guiding the safe driving of other vehicles.

In the present invention, speakers are provided at the left and right sides of the main body of the warning lamp such that the speakers are spaced apart from each other, and the speakers simultaneously output a sound in a state in which the sound is divided into treble and bass in order to feel as if there were several vehicles, thereby maximizing ambience and tension.

In addition, in the present invention, a lighting bar is coupled to the front surface and the rear surface of the sub body of the warning lamp such that the lighting bar can be selectively unfolded in order to function as an emergency triangular stand or a shaking bar, thereby improving external visibility of the warning lamp and thus effectively preventing collisions with other vehicles while guiding the safe driving of other vehicles.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A height-adjustable warning lamp with an emergency light indicating means comprising:
    a main body installed on an outer roof of a vehicle in a fixed state, the main body having lighting parts formed at a front surface and a rear surface thereof and at a left side surface and a right side surface thereof;
    a sub body received in the main body such that the sub body can be moved upward, the sub body having lighting parts formed at a front surface and a rear surface thereof such that the sub body can function as a separate warning lamp, the sub body being movable upward such that the sub body can extend to a predetermined height; and
    a lift unit for interconnecting the main body and the sub body through a lift driving link and a lift driven link, which are coupled to each other in an X shape, the lift unit being driven to extend the height of the sub body, wherein
    the main body and the sub body are coupled to each other such that the main body and the sub body are separated from each other in a vertical direction in order to extend the height of the sub body based on situations on a road, and
    an indication plate is coupled to the lift driving link and the lift driven link of the lift unit such that the indication plate is unfolded when the sub body is moved upward according to a driving operation of the lift unit, and the indication plate is folded and received in the main body when the sub body is moved downward according to the driving operation of the lift unit, the indication plate having a blinking light emitting diode (LED) lamp or an LED indication window for message announcement formed at an exposed surface thereof.

2. The height-adjustable warning lamp according to claim 1, wherein the indication plate is an arrow for indicating an advancing direction.

3. The height-adjustable warning lamp according to claim 2, wherein the indication plate comprises:
    a main frame provided with a guide rail for guiding a hinge of the lift driving link; and
    direction-indicating frames coupled to opposite ends of the main frame via hinges such that the direction-indicating frames are elastically unfolded when the sub body is moved upward, and the direction-indicating frames are folded when the sub body is moved downward.

4. The height-adjustable warning lamp according to claim 1, wherein a lighting bar, to which an LED lamp is applied, is coupled to the front surface or the rear surface of the sub body such that the lighting bar can be selectively unfolded in order to function as an emergency triangular stand or a shaking bar.

5. The height-adjustable warning lamp according to claim 4, wherein the lighting bar is connected to a driving shaft of a driving motor installed in the sub body or a rotary shaft connected to the driving shaft, and the lighting bar, which is connected to the rotary shaft, is unfolded by the driving motor according to an input control program.

6. The height-adjustable warning lamp according to claim 4, wherein a pair of speakers is provided at left and right sides of the main body, and the speakers are configured to simultaneously output a sound in a state in which the sound is divided into treble and bass in order to feel as if there were several vehicles.

7. The height-adjustable warning lamp according to claim 1, wherein the lift unit comprises:
    a connecting rod connected between a pair of the lift driving links;
    a linear bearing block coupled to one side of a lower end of each of the lift driving links;
    a stationary block formed at one end of a lower surface in the sub body such that an upper end of each of the lift driving links is rotatably coupled to the stationary block;
    a movable block formed at the other end of the lower surface in the sub body such that an upper end of each of the lift driven links is movably coupled to the movable block;
    linear rails formed at a bottom surface of the main body and at the lower surface of the sub body such that the other side of the lower end of each of the lift driving links and the other side of the upper end of each of the lift driven links are rotatably coupled to the linear rails, the linear bearing block, which is coupled to one side of the lower end of each of the lift driving links, and the movable block, which is coupled to the upper end of each of the lift driven links, being linearly movably coupled to the linear rails; and
    a driving unit, having a driving rod rotatably connected to the connecting rod via a hinge, for linearly moving the lift driving links and the lift driven links along the linear rails such that the lift driving links and the lift driven links can be moved upward and downward.

8. The height-adjustable warning lamp according to claim 1, wherein the lift unit comprises:
    a connecting rod connected between a pair of the lift driving links;
    a sliding pipe coupled to one side of a lower end of each of the lift driving links;
    a stationary block formed at one end of a lower surface in the sub body such that an upper end of each of the lift driving links is rotatably coupled to the stationary block;
    a movable block formed at the other end of the lower surface in the sub body such that an upper end of each of the lift driven links is movably coupled to the movable block;
    square-shaped pipe rails formed at a bottom surface of the main body and at the lower surface of the sub body such that the other side of the lower end of each of the lift driving links and the other side of the upper end of each of the lift driven links are rotatably coupled to the pipe rails, the sliding pipe, which is coupled to one side of the lower end of each of the lift driving links, and the movable block, which is coupled to the upper end of each of the lift driven links, being linearly movably coupled to the pipe rails; and
    a driving unit, having a driving rod rotatably connected to the connecting rod via a hinge, for linearly moving the lift driving links and the lift driven links along the pipe rails such that the lift driving links and the lift driven links can be moved upward and downward.

* * * * *